US006616572B2

(12) United States Patent
Suzuki

(10) Patent No.: US 6,616,572 B2
(45) Date of Patent: Sep. 9, 2003

(54) HILL HOLD CONTROL APPARATUS FOR VEHICLE

(75) Inventor: Kiyoaki Suzuki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/994,018

(22) Filed: Nov. 27, 2001

(65) Prior Publication Data

US 2002/0065170 A1 May 30, 2002

(30) Foreign Application Priority Data

Nov. 28, 2000 (JP) .......................... 2000-360516

(51) Int. Cl.[7] .............................................. F16H 61/22
(52) U.S. Cl. ........................ 477/86; 477/114; 477/171; 477/901
(58) Field of Search .............................. 74/336 R, 339, 74/340; 477/83, 86, 114, 171, 901

(56) References Cited

U.S. PATENT DOCUMENTS

| | | | | |
|---|---|---|---|---|
| 5,172,797 A | * | 12/1992 | Stout et al. | 192/13 R |
| 5,769,752 A | * | 6/1998 | Kim | 477/114 |
| 5,820,515 A | * | 10/1998 | Fukaya et al. | 477/901 |
| 5,943,911 A | * | 8/1999 | Beckerman | 74/333 |
| 6,039,673 A | * | 3/2000 | Mikami et al. | 477/93 |

FOREIGN PATENT DOCUMENTS

| | | |
|---|---|---|
| JP | 2000-65199 | 3/2000 |
| JP | 2000-127928 | 5/2000 |

* cited by examiner

*Primary Examiner*—Sherry Estremsky
(74) *Attorney, Agent, or Firm*—McGinn & Gibb, PLLC

(57) ABSTRACT

A hill hold control apparatus of an automatic transmission having a plurality of drive gears mounted on an input shaft, a plurality of driven gears meshing with the respective drive gears and mounted on an output shaft and a bypass clutch for engaging the input shaft with the output shaft, includes a grade judging means for judging that the vehicle travels on a grade, a shift gear train detecting means for detecting a shift gear train of the automatic transmission, a foot brake operation detecting means for detecting an operation of a foot brake and a control means for engaging the bypass clutch when it is judged that the vehicle is in standstill and the shift gear train is a start gear train and the foot brake is inoperative based on respective signals of the grade, the shift gear train and the operation of the foot brake.

16 Claims, 5 Drawing Sheets

HILL HOLD CONTROL APPARATUS FOR VEHICLE

BACKGROUND OF THE INVENTION

1. Field of the Invention

The present invention relates to a hill hold control apparatus for a vehicle and more particularly to a hill hold control apparatus capable of locking wheels when a selector lever of an automatic transmission is positioned at "forward or reverse drive" range.

2. Description of Background Arts

Japanese Patent Application Laid-open No. Toku-Kai 2000-65199 discloses an automatic transmission for an automobile comprising an input shaft having a plurality of drive gears, an output shaft having a plurality of driven gears paired with respective drive gears and a bypass clutch for engaging the input shaft with the output shaft. This type of automatic transmission has an advantage in that the rotation speed of the output shaft can be synchronized with the engine speed and shift shocks at up-shifting can be reduced by preventing so-called "torque drop" by transmitting torque through the bypass clutch in high speed shift stages. However, this type automatic transmission, in case where a friction clutch is used as a start clutch for engaging a crank shaft with the input shaft, has a problem that when the vehicle attempts to start forward on a grade, the vehicle reverses, while a driver shifts his or her foot from a brake pedal to an accelerator pedal and the friction clutch which has been released at stopping is engaged again.

On the other hand, automatic transmissions of normal torque converter type having planetary gears generate creep torque. If a vehicle stops on a steep grade, creep torque can not hold the vehicle at a standstill and the vehicle reverses. Japanese Patent Application Laid-open No. Toku-Kai 2000-127928 discloses a hill hold control apparatus capable of locking wheels by a brake system when the select lever of an automatic transmission is selected at a forward drive position and specified conditions are satisfied. However, this hill hold apparatus needs to incorporate an accumulator and an electromagnetic operative opening and closing valve in the apparatus, this leading to an increase of the number of components and manufacturing cost.

SUMMARY OF THE INVENTION

It is an object of the present invention to provide a hill hold control apparatus for a vehicle capable of performing a hill hold control easily by utilizing a bypass clutch provided between an input shaft and an output shaft of an automatic transmission.

To achieve the object, a hill hold control apparatus comprises a grade judging means for judging that the vehicle travels on a grade, a shift gear train detecting means for detecting a shift gear train of the automatic transmission, a foot brake operation detecting means for detecting an operation of a foot brake, a first control means for partially engaging the bypass clutch when it is judged that the vehicle is in standstill and the shift gear train is a start gear train and the foot brake is operative based on respective signals of the grade, the shift gear train and the operation of the foot brake and a second control means for engaging the bypass clutch when it is judged that the vehicle is in standstill and the shift gear train is a start gear train and the foot brake is inoperative based on respective signals of the grade, the shift gear train and the operation of the foot brake.

DESCRIPTION OF THE PREFERRED EMBODIMENTS

Figure 1:
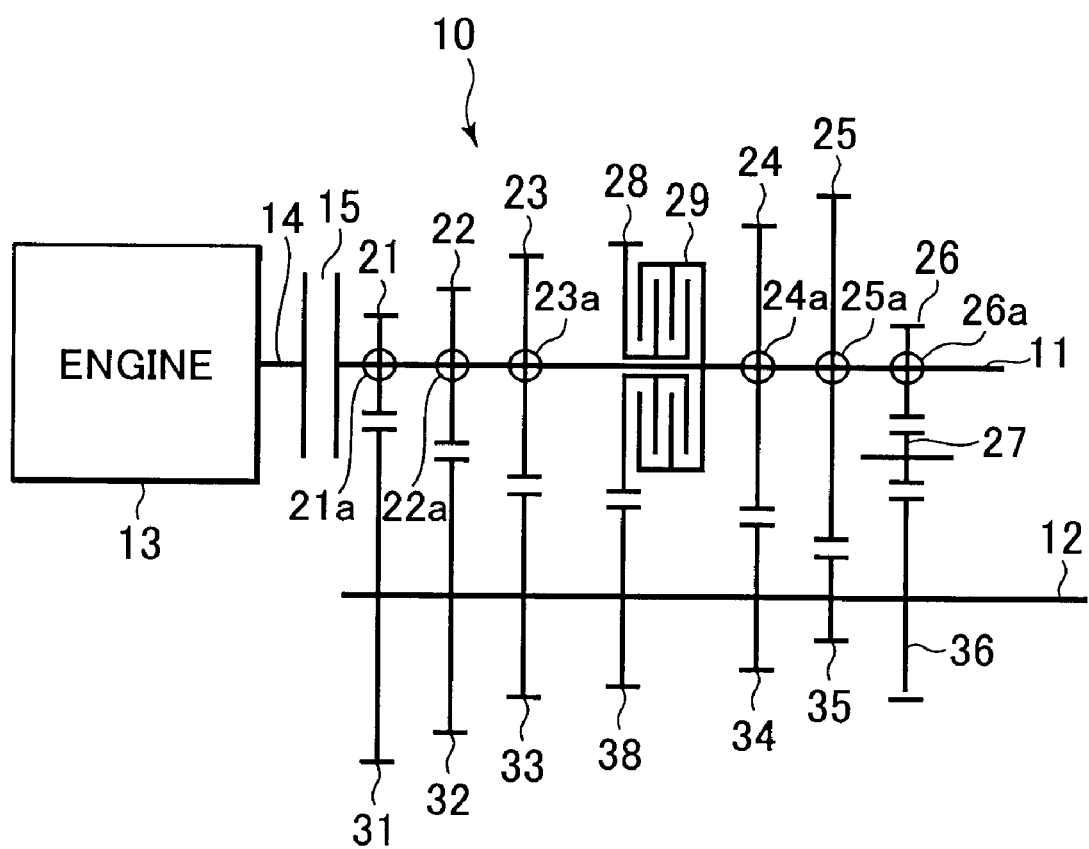
FIG. 1 is a skeleton diagram showing an automatic transmission having a hill hold apparatus according to the present invention.

Referring now to FIG. 1, reference numeral 10 denotes an automatic transmission having an input shaft 11 and an output shaft 12. There is provided a main clutch (start clutch) 15 between a crankshaft 14 of an engine 13 and an input shaft 11. When the main clutch 15 is engaged, the rotation of the crankshaft 14 is transmitted to the input shaft 11 and when the main clutch 15 is released, the power transmission stops. The main clutch 15 is driven by a hydraulically operated actuator.

Drive gears 21 to 25 for the $1^{st}$ gear ratio to the $5^{th}$ gear ratio respectively are mounted on the input shaft 11 and driven gears 31 to 35 for the $1^{st}$ gear ratio to the $5^{th}$ gear ratio respectively are mounted on the output shaft 12. The respective driven gears 31 to 35 mesh with the respective drive gears 21 to 25, constituting respective shift gear trains from $1^{st}$ to $5^{th}$ gear ratios. Further, a drive gear 26 for reverse speed is mounted on the input shaft 11 and meshes with a driven gear 36 which is mounted on the output shaft 12 through an idle gear 27. These drive gear 26, driven gear 36 and idle gear 27 constitute a reverse gear train. In order to change over the shift gear trains for transmitting rotation from the input shaft 11 to the output shaft 12, there are provided dog clutches 21a to 26a for the respective drive gears 21 to 26 on the input shaft 11.

For example, when the dog clutch 21a is engaged, the rotation of the input shaft 11 is transmitted to the output shaft 12 through the shift gear train of the drive gear 21 and the driven gear 31. With respect to other shift gear trains, similarly, when a dog clutch is engaged, a required shift gear train is selected. In place of the dog clutches, wet multiple disc clutches may be used or synchromesh mechanisms may be employed. Further, respective changeover mechanisms may be provided on the output shaft 12 or may be provided both on the input and output shafts 11, 12. According to the embodiment, the changeover mechanism is actuated by a hydraulically operated actuator to select a shift gear train.

A drive side bypass gear 28 is rotatably mounted on the input shaft 11 and a driven side bypass gear 38 meshing with the bypass gear 28 is fixed to the output shaft 12. Further, a bypass clutch (auxiliary clutch) 29 is mounted on the input shaft 11. The bypass clutch 29 is a wet type multiple disc clutch which can be operated in an engagement condition, in a partially engaged condition and in a released condition. This bypass clutch 29 can prevent "torque drop" at shifting by being engaged when the gear is up-shifted. This bypass clutch 29 may mounted on the output shaft 12 or may be mounted on an intermediate shaft other than the input and output shafts 11, 12. The bypass clutch 29 is actuated by an hydraulically operated actuator.

In the automatic transmission 10 having the bypass clutch 29, using the bypass clutch 29 for originally preventing "torque drop" at shifting, a hill hold control can be performed by engaging the bypass clutch 29 on a grade. For example, when a vehicle is in standstill on an upgrade, the gear train of the $1^{st}$ gear ratio is in a power transmitting condition and at the same time the bypass clutch 29 is engaged. As a result, since the gear ratio of the gear train composed of the gears 21, 31 differs from the one of the bypass gears 28, 38, a circulating torque generates between the input shaft 11 and the output shaft 12 and as a result the wheels are locked. The shift gear train used when the hill hold control is performed may be a gear train for the $1^{st}$ gear ratio or a gear train for the $2^{nd}$ gear ratio.

As described above, since the bypass clutch 29 is operated by hydraulic pressure fed from the actuator, the hill hold control can be performed by electronically detecting the selected shift gear train of the $1^{st}$ gear ratio, $2^{nd}$ gear ratio or reverse speed and controlling a hydraulic pressure to the actuator. Thus, since the hill hold control is assisted by an electronic control, by releasing the bypass clutch 29 according to the positions of the shift gear trains and operations of miscellaneous pedals, the vehicle can roll forward or rearward freely and by calculating a gradient angle of the vehicle or output torque, the vehicle can start smoothly.

Figure 2:
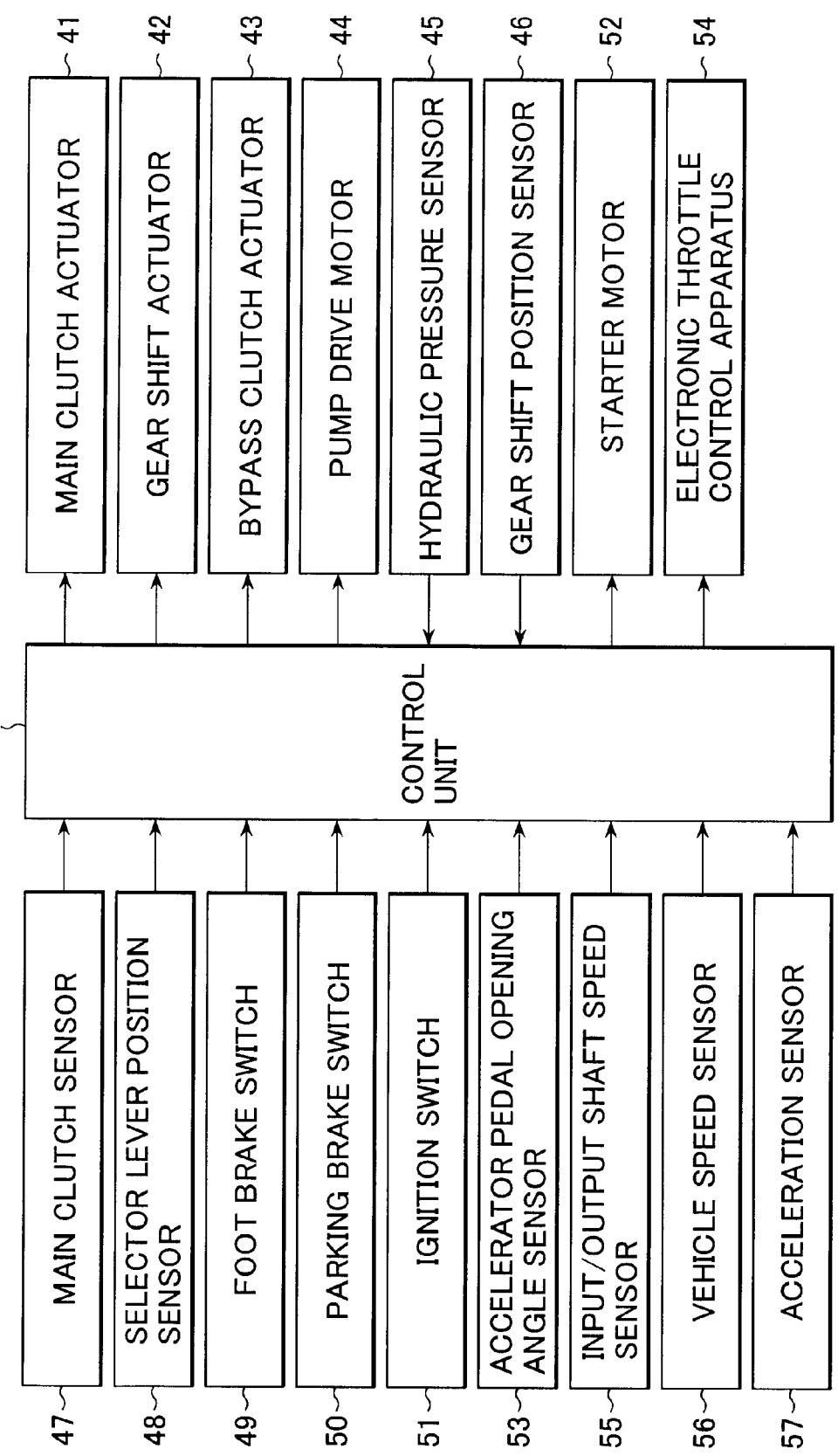
FIG. 2 is a block diagram showing a control circuit for controlling an engine and an automatic transmission shown in FIG. 1.

Referring to FIG. 2, reference numeral 40 denotes a control unit having a CPU and memories. The control unit 40 sends control signals to a main clutch actuator 41 for actuating the main clutch 15, a gear shift actuator 42 for changing over the shift gear train by actuating the dog clutches 21a to 26a, a bypass clutch actuator 43 for actuating the bypass clutch 29. Working fluid is supplied from a hydraulic pump driven by a pump drive motor 44 to these actuators 41 to 43. The pump drive motor 44 is controlled by signals from the control unit 40. The pressure of working fluid discharged from the hydraulic pump is detected by a hydraulic pressure sensor 45. The gear shift position (gear train position) is detected by a gear shift position sensor 46. The clutch stroke of the main clutch 15 is detected by a main clutch sensor 47. Signals from the respective sensors are sent to the control unit 40. The hydraulic pump may be driven by an engine not by the motor 44.

When a driver operates a selector lever, miscellaneous ranges such as Drive "D" range and Reverse "R" range are selected There is provided a selector lever position sensor 48 for detecting a selected range and there is provided a foot brake switch 49 for detecting whether or not a foot brake has been operated by the driver. Further, there is provided a parking brake switch 50 for detecting whether or not a parking brake has been operated. Respective detecting signals are sent to the control unit 40.

When an ignition key is operated, an ignition key switch 51 sends a signal to the control unit 40. The control unit 40 sends an operating signal to a starter motor 52. A signal from an accelerator pedal opening angle sensor 53 for detecting the depressing amount of an accelerator pedal is sent to the control unit 40. The control unit 40 sends a control signal to an electronic throttle valve control apparatus (ETC) 54. Further, the control unit 40 receives detecting signals from an input and output shaft speed sensor 55 for detecting the revolution speed of the input and output shafts, from a vehicle speed sensor 56 for detecting vehicle speeds and from an acceleration sensor 57 for detecting lateral acceleration of the vehicle.

Figure 3:
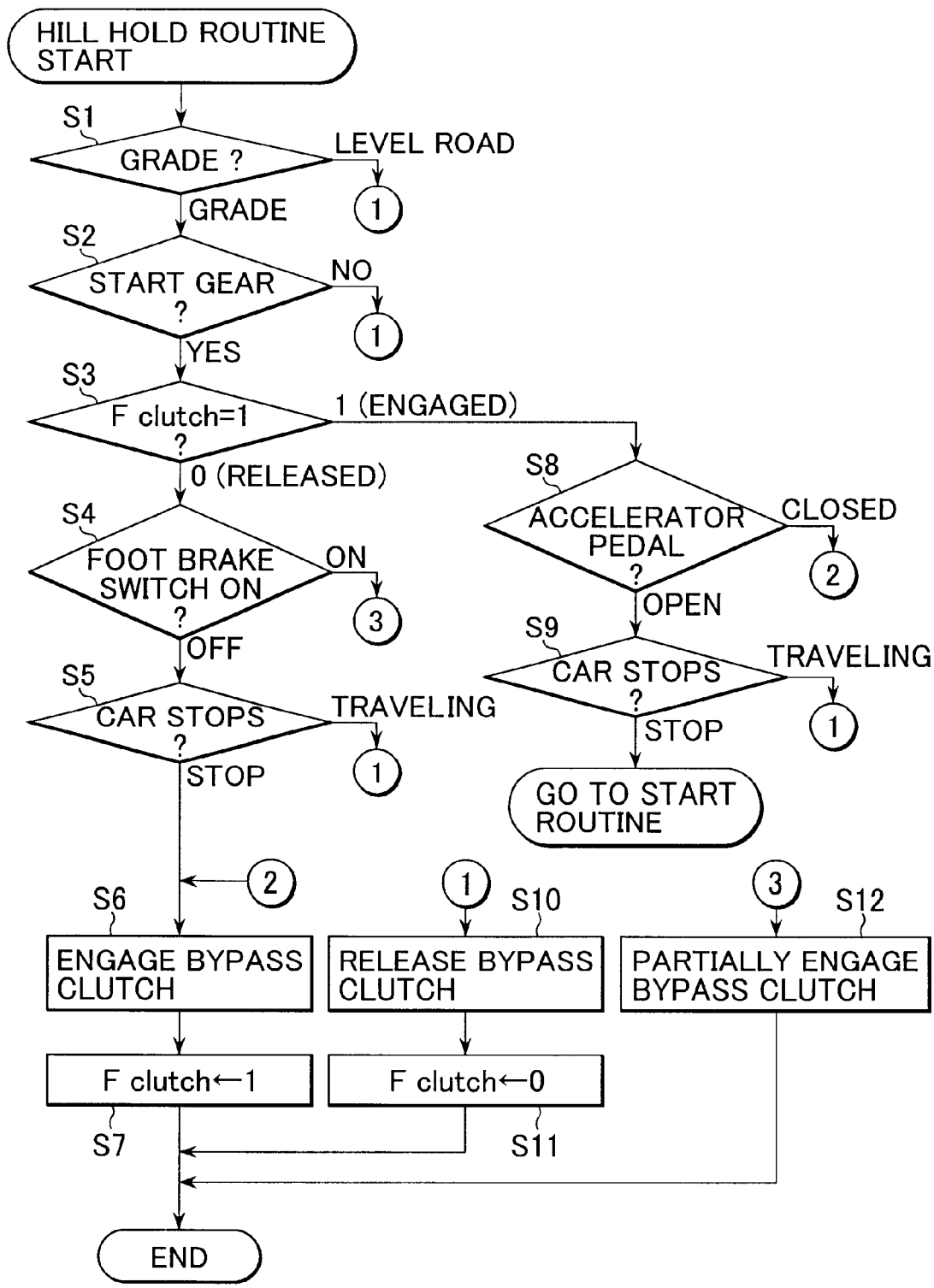
FIG. 3 is a flowchart showing a hill hold routine according to an embodiment of the present invention.

FIG. 3 is a flowchart showing steps of a hill hold control of an automatic transmission of FIG. 1. In the drawing, at a step S1, it is judged whether or not a vehicle travels on a grade. This judgment can be made by a known method. For example, whether or not a vehicle travels on a grade is judged based on respective detecting signals from a gear shift position sensor 46, a vehicle speed sensor 56, an acceleration sensor 57, an input and output shaft rotation speed sensor 55 and the like or the judgment is made based on a signal from an incline angle sensor.

When it is judged that the vehicle travels on a grade, at a step S2, it is judged whether or not the shift gear train is a start gear train. The start gear train is either of shift gear trains, $1^{st}$ gear ratio, $2^{nd}$ gear ratio and reverse speed. When a driver shifts the selector lever to "D" range, the $1^{st}$ gear ratio or the $2^{nd}$ gear ratio are automatically selected according to the vehicle traveling situations. When the driver shifts the selector lever to "R" range, a shift gear train of reverse speed is selected.

At a step S3, an engagement condition of the bypass clutch 29 is judged from a flag. In case where it is judged at the step S3 that a clutch flag is 0, namely, the bypass clutch 29 is in a released condition, the program goes to a step S4 where it is judged whether or not a foot brake is depressed by detecting an ON or OFF operation of the foot brake switch 49. When it is judged at the step S4 that the foot brake is not depressed, the program goes to a step S5 where it is judged whether or not the vehicle stops or the vehicle is in standstill. In case where it is judged that the vehicle stops, the program goes to a step S6 where the bypass clutch 29 is engaged and at a step S7 a clutch flag $F_{clutch}$ is set to 1 (it means that bypass clutch is engaged). Thus, the hill hold routine has been executed and wheels are locked. For example, after the foot brake is depressed with the selector lever set to "D" range and the vehicle stops on a grade, even when the driver takes his or her foot from the foot brake pedal, the wheels are locked by the hill hold control and the vehicle is held in standstill. Then, when the vehicle stops with a start gear train selected, the main clutch 15 is controlled in a released condition, unless the vehicle is equipped with an automatic stopping and starting system.

In case where it is judged at the step S1 that the vehicle travels on a level road, in case where it is judged at the step S2 that a gear train other than the start gear train is selected or in case where it is judged at the step S5 that the vehicle is traveling, the program goes to a step S10 where the bypass clutch 29 is released and at a step S11 the clutch flag is set to a released condition (0). On the other hand, at the step S4, in case where it is judged that a foot brake is depressed, the step 12 is executed and the bypass clutch 29 is established to a partially engaged condition. In this case, the routine finishes without changing the clutch flag. Thus, when it is judged at the step S4 that the foot brake pedal is depressed, since the bypass clutch 29 is partially engaged, the bypass clutch 29 can be engaged swiftly, when the depression of the foot brake pedal is released.

On the other hand, in case where it is judged at the step S3 that the bypass clutch 29 is in an engaged condition, the program goes to a step S8 where the state of the accelerator pedal is detected based on a signal from the accelerator pedal opening angle sensor 53. At the step S8, if it is judged that the accelerator pedal is closed, the program goes to the step S6 where the hill hold control is maintained and if it is judged that the accelerator pedal is open, the program goes to a step S9 where it is judged whether the vehicle stops or travels. At the step S9, in case where it is judged that the vehicle is not in standstill, the program goes to the step S10 and in case where it is judged that the vehicle is in standstill, the start routine is executed. That is, when the accelerator pedal is depressed while the vehicle is in standstill, the start routine is executed.

Figure 4:
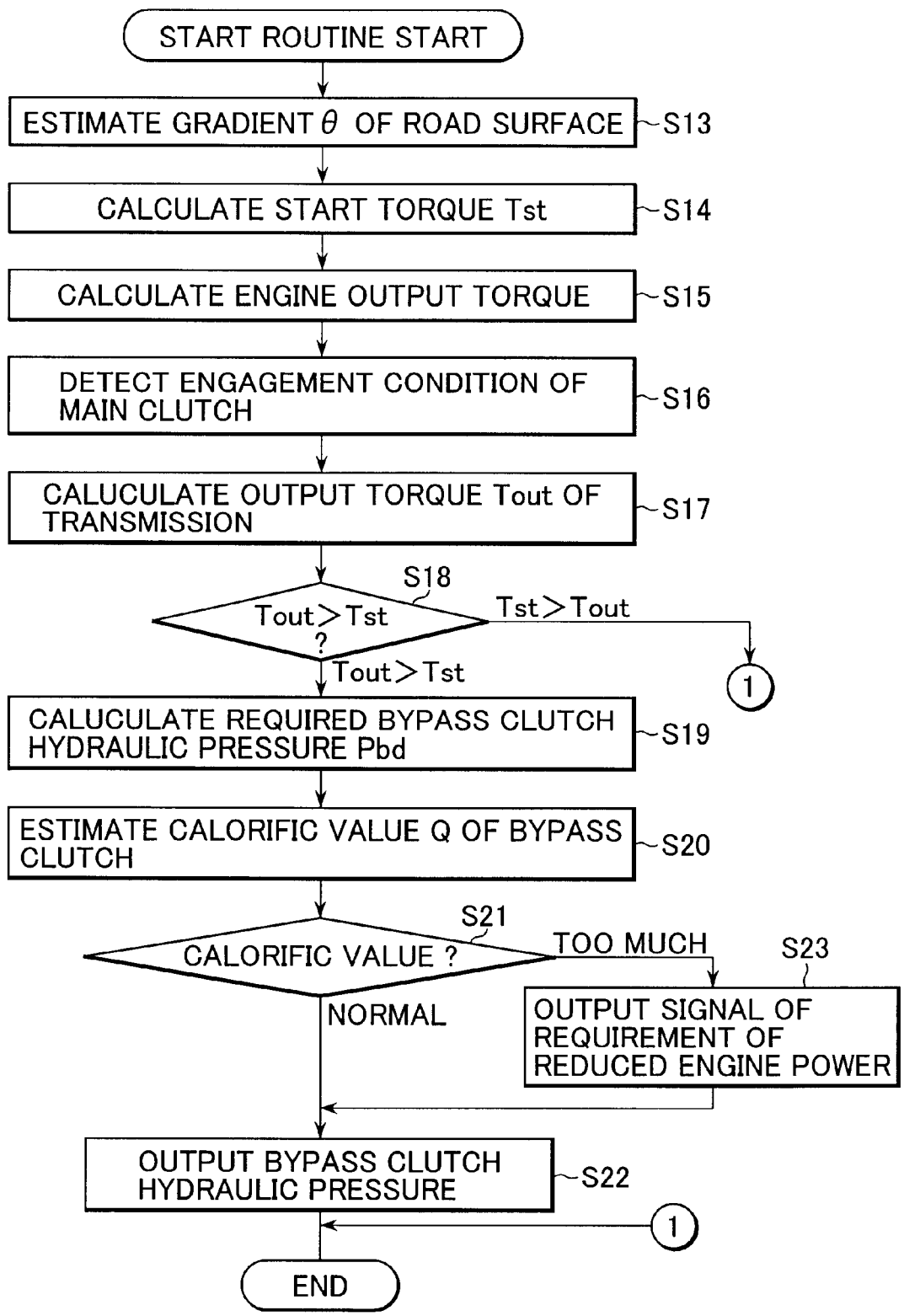
FIG. 4 is a flowchart showing a start routine.

FIG. 4 is a flowchart showing a start routine. When the start routine is carried out, first at a step S13, a road surface gradient θ of the grade is estimated. The road surface gradient θ may be calculated from driving force and vehicle speed or may be calculated by a signal from the incline angle sensor. At a step S14, a start torque $T_{st}$ necessary for starting is calculated according to the following formula (1):

$$T_{st}=K_{st}\cdot(W1+W1\cdot\sin\theta) \quad (1)$$

where $K_{st}$ is a setting constant for fine adjustment; W1 is start torque on a level road. These values are obtained by experiments and are stored in a memory.

It is understood from this formula that the start torque Tst increases as the road surface gradient θ increases.

Next, at a step S15, an engine output torque is calculated based on signal from an engine speed sensor and the like according to a known method. Then, the program goes to S16 where the condition of engagement of the main clutch, namely, the clutch stroke is detected based on a signal of the main clutch sensor 47 and at a step S17 an output torque $T_{out}$ of the automatic transmission is calculated based on the engine output torque obtained at the step S15, the engagement condition of the main clutch obtained at the step S16 and the gear ratio detected by the gear shift position sensor 46.

Next, at a step S18, the start torque $T_{st}$ calculated at the step S14 is compared with the output torque $T_{out}$ calculated at the step S17. If the output torque $T_{st}$ is larger than Tout, it is judged that the vehicle can start and if not it is judged that the vehicle can not start. In case where the vehicle can start, at a step S19, a hydraulic pressure $P_{bd}$ necessary for releasing the bypass clutch is calculated. The hydraulic pressure value $P_{bd}$ is calculated according to the following formulas (2), (3) and (4):

$$P_{db}[T_{bd}+(2\cdot N\cdot\mu_b\cdot R_{bc})\cdot F_s]/[(2\cdot N\cdot\mu_b\cdot R_{bc})\cdot S_b\cdot 10^6] \quad (2)$$

$$T_{bd}=T_{st}/[G_f/(G_c\cdot G_b-\alpha)] \quad (3)$$

$$\alpha=K_v\cdot[(\text{present vehicle speed}-\text{previous vehicle speed})]/\text{control period} \quad (4)$$

where $G_f$ is final gear ratio; $G_c$ is present gear ratio; $G_b$ is gear ratio of the bypass clutch; N is pressure of clutch facing of the bypass clutch 29; $K_v$ is gain coefficient and is determined from a table parameterizing vehicle speed; N is pressure of clutch facing of the bypass clutch 29; $\mu_b$ is friction coefficient of the clutch facing; $R_{bc}$ is average effective radius of the clutch facing; $F_s$ is spring load and $S_b$ is area of clutch facing.

At a step S20, a calorific value Q of the bypass clutch 29 is estimated and at a step S21 the calorific value Q is compared with a seizure limit calorific value of the bypass clutch 29 which is stored in the memory. The seizure limit calorific value is determined by experiments beforehand. In case where it is judged that the calorific value Q is within an allowable range, the program goes to a step S22. On the other hand, in case where it is judged that the calorific value Q is too much, the program goes to a step S23 where a reduction of engine output is required to the engine control unit. Then, at a step S22 hydraulic pressure of the bypass clutch 29 is outputted to the control unit. Thus, in case where there is fear of seizure in the bypass clutch 29, the engine output gradually goes down to prevent seizure.

The calorific value Q estimated at the step S20 is obtained from the following formula (5):

$$Q=[(P_{dc}\cdot\text{piston area}-\text{return spring force})\cdot R_{bc}\cdot\mu_b\cdot\text{number of rotation difference between bypass clutches}]/S_b \quad (5)$$

The calorific value Q becomes larger as the required hydraulic pressure is large, that is, the gradient is large. Further, the calorific value Q becomes larger with an increase of the number of rotation difference of the bypass clutch. In case of an excessive calorific value Q, the requirement of torque reduction continues to be issued and as a result the vehicle can not start. However, this is a very rare case in which the gradient exceeds far away 30%.

A greatest feature of the hill hold apparatus according to the present invention is that a hill hold can be realized only by hydraulically controlling an existing bypass clutch 29. Therefore, the hill hold apparatus does not require to incorporate any special devices such as brake piping, an accumulator and the like. Further, since the hill hold apparatus according to the present invention can perform a hill hold control based on road conditions, the vehicle can start smoothly without stepping back on a grade. Further, since the hill hold apparatus can start the vehicle within an allowable limit of calorific value of the bypass clutch, the drive train is prevented from being damaged by overloads.

Figure 5:
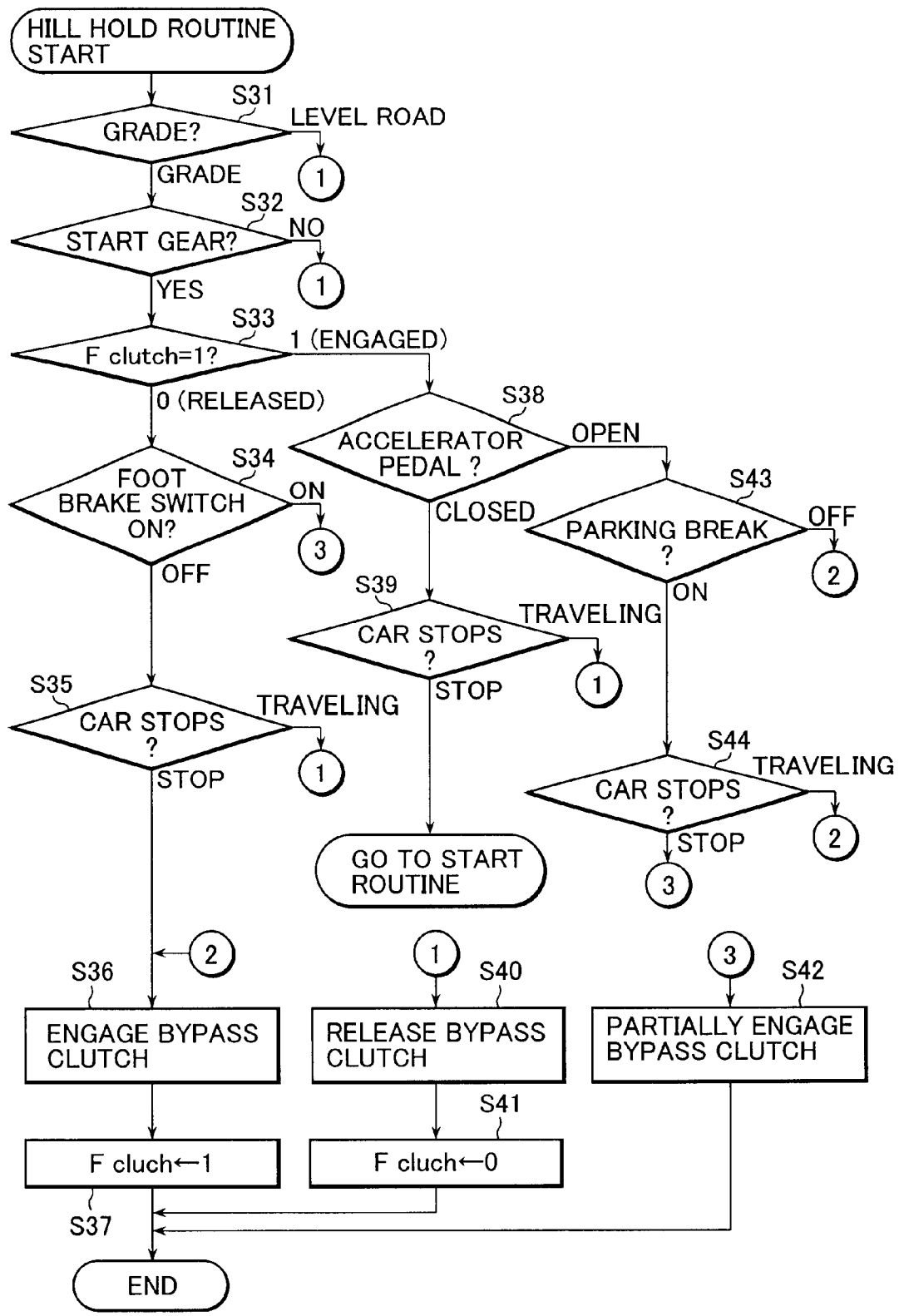
FIG. 5 is a flowchart showing a hill hold routine according to another embodiment of the present invention.

FIG. 5 is a flowchart showing steps of a hill hold control according to another embodiment. Since steps S31 to S42 of FIG. 5 correspond to steps S1 to S12 of FIG. 3, respectively, descriptions of respective steps S31 to S42 are omitted. At a step S38, it is judged that the accelerator pedal is closed, the program goes to a step S43 where it is judged whether or not the parking brake is operative. If it is judged that the parking brake is operative, the program goes to a step S44 where it is judged whether or not the vehicle is in standstill. In case where it is judged that the vehicle is in standstill, at a step S42, the bypass clutch 29 is set to a partially engaged condition. After that, the program leaves the routine without changing the clutch flag. At the step 43, in case where it is judged that the parking brake is inoperative, or at a step S44 in case where it is judged that the vehicle is traveling, the program goes to a step S36 where the bypass clutch is set to an engaged condition.

According to the control method shown in FIG. 5, when the parking brake is operative, the hill hold control is available with the bypass clutch 29 partially engaged. As a result, it is possible to reduce a power for operating the bypass clutch 29, this contributing to an improvement of fuel economy. When the accelerator pedal opens in a standstill of the vehicle, the start routine shown in FIG. 4 is carried out. According to the control method shown in FIG. 5, when the parking brake is operative, since the bypass clutch can be partially engaged, the working pressure of the bypass clutch 29 can be reduced and as a result fuel consumption can be saved.

While the present invention has been disclosed in terms of preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A hill hold control apparatus of a vehicle having an automatic transmission including a plurality of drive gears mounted on an input shaft, a plurality of driven gears meshing with said drive gears and mounted on an output shaft and a bypass clutch for engaging said input shaft with said output shaft, comprising:

grade judging means for judging that said vehicle travels on a grade;

shift gear train detecting means for detecting a shift gear train of said automatic transmission; and control means for engaging said bypass clutch when it is judged that said vehicle is in standstill and said shift gear train is a start gear train based on respective signals of said grade judging means and said shift gear train detecting means.

2. The hill hold control apparatus according to claim 1, further comprising;

road gradient estimating means for estimating a road surface gradient of a road on which said vehicle travels;

start torque calculating means for calculating a start torque necessary for starting said vehicle based on said road surface gradient;

output torque calculating means for calculating an output torque based on an engine torque and an engagement condition of a main clutch; and bypass clutch releasing means for releasing said bypass clutch when said output torque exceeds said start torque so as to start said vehicle.

3. The hill hold control apparatus according to claim 1, further comprising:

calorific value calculating means for calculating a calorific value of said bypass clutch; and engine power reducing means for reducing an engine power when said calorific value exceeds a threshold value.

4. A hill hold control apparatus of a vehicle having an automatic transmission including a plurality of drive gears mounted on an input shaft, a plurality of driven gears meshing with said drive gears and mounted on an output shaft and a bypass clutch for engaging said input shaft with said output shaft, comprising:

grade judging means for judging that said vehicle travels on a grade;

shift gear train detecting means for detecting a shift gear train of said automatic transmission;

foot brake operation detecting means for detecting an operation of a foot brake; and control means for engaging said bypass clutch when it is judged that said vehicle is in standstill and said shift gear train is a start gear train and said foot brake is inoperative based on respective signals of said grade judging means, said shift gear train detecting means and said foot brake operation detecting means.

5. The hill hold control apparatus according to claim 4, further comprising:

road gradient estimating means for estimating a road surface gradient of a road on which said vehicle travels;

start torque calculating means for calculating a start torque necessary for starting said vehicle based on said road surface gradient;

output torque calculating means for calculating an output torque based on an engine torque and an engagement condition of a main clutch; and bypass clutch releasing means for releasing said bypass clutch when said output torque exceeds said start torque so as to start said vehicle.

6. The hill hold control apparatus according to claim 4, further comprising:

calorific value calculating means for calculating a calorific value of said bypass clutch; and engine power reducing means for reducing an engine power when said calorific value exceeds a threshold value.

7. A hill hold control apparatus of a vehicle having an automatic transmission including a plurality of drive gears mounted on an input shaft, a plurality of driven gears meshing with said drive gears and mounted on an output shaft and a bypass clutch for engaging said input shaft with said output shaft, comprising:

grade judging means for judging that said vehicle travels on a grade;

shift gear train detecting means for detecting a shift gear train of said automatic transmission;

foot brake operation detecting means for detecting an operation of a foot brake;

first control means for partially engaging said bypass clutch when it is judged that said vehicle is in standstill and said shift gear train is a start gear train and said foot brake is operative based on respective signals of said grade judging means, said shift gear train detecting means and said foot brake; and second control means for engaging said bypass clutch when it is judged that said vehicle is in standstill and said foot brake is inoperative based on respective signals of said grade judging means, said shift gear train detecting means and said foot brake operation detecting means.

8. The hill hold control apparatus according to claim 7, further comprising:

road gradient estimating means for estimating a road surface gradient of a road on which said vehicle travels;

start torque calculating means for calculating a start torque necessary for starting said vehicle based on said road surface gradient;

output torque calculating means for releasing said bypass clutch when said output torque exceeds said start torque so as to start said vehicle.

9. The hill hold control apparatus according to claim 7, further comprising:

calorific value calculating means for calculating a calorific value of said bypass clutch; and engine power reducing means for reducing an engine power when said calorific value exceeds a threshold value.

10. A hill hold control apparatus of a vehicle having an automatic transmission including a plurality of drive gears mounted on an input shaft, a plurality of driven gears meshing with said drive gears and mounted on an output shaft and a bypass clutch for engaging said input shaft with said output shaft, comprising:

grade judging means for judging that said vehicle travels on a grade;

shift gear train detecting means for detecting a shift gear train of said automatic transmission;

parking brake operation detecting means for detecting an operation of a parking brake;

first control means for partially engaging said bypass clutch when it is judged that said vehicle is in standstill and said shift gear train is a start gear train and said parking brake is operative based on respective signals of said grade judging means, said shift gear train detecting means and said parking brake operation detecting means; and second control means for engaging said bypass clutch when it is judged that said vehicle is in a standstill and said shift gear train is a start gear train and said parking brake is inoperative based on respective signals of said grade judging means, said shift gear train detecting means and said parking brake operation detecting means.

11. The hill hold control apparatus according to according to claim 10, further comprising:

road gradient estimating means for estimating a road surface gradient of a road on which said vehicle travels;

start torque calculating means for calculating a start torque necessary for starting said vehicle based on said road surface gradient;

output torque calculating means for calculating an output torque based on an engine torque and an engagement condition of a main clutch; and bypass clutch releasing means for releasing said bypass clutch when said output torque exceeds said start torque sp as to start said vehicle.

12. The hill hold control apparatus according to claim 10, further comprising:

calorific value calculating means for calculating a calorific value of said bypass clutch; and engine power reducing means for reducing an engine power when said calorific value exceeds a threshold value.

13. A method for controlling a vehicle to hold its position on a hill, said vehicle having an automatic transmission including a plurality of drive gears mounted on an input shaft, a plurality of driven gears meshing with said drive gears and mounted on an output shaft and a bypass clutch for engaging said input shaft with said output shaft, the method comprising:

judging that said vehicle travels on a grade;

detecting a shift gear train of said automatic transmission; and engaging said bypass clutch when it is judged that said vehicle is in standstill and said shift gear train is a start gear train.

14. A method for controlling a vehicle to hold its position on a hill, said vehicle having an automatic transmission including a plurality of drive gears mounted on an input shaft, a plurality of driven gears meshing with said drive gears and mounted on an output shaft and a bypass clutch for engaging said input shaft with said output shaft, the method comprising:

judging that said vehicle travels on a grade;

detecting a shift gear train of said automatic transmission;

detecting an operation of a foot brake; and engaging said bypass clutch when it is judged that said vehicle is in standstill and said shift gear train is a start gear train and said foot brake is inoperative.

15. A method for controlling a vehicle to hold its position on a hill, said vehicle having an automatic transmission including a plurality of drive gears mounted on an input shaft, a plurality of driven gears meshing with said drive gears and mounted on an output shaft and a bypass clutch for engaging said input shaft with said output shaft, the method comprising:

judging that said vehicle travels on a grade;

detecting a shift gear train of said automatic transmission;

detecting an operation of a foot brake;

partially engaging said bypass clutch when it is judged that said vehicle is in standstill and said shift gear train is a start gear train and said foot brake is operative; and engaging said bypass clutch when it is judged that said vehicle is in standstill and said foot brake is inoperative.

16. A method for controlling a vehicle to hold its position on a hill, said vehicle having an automatic transmission including a plurality of drive gears mounted on an input shaft, a plurality of driven gears meshing with said drive gears and mounted on an output shaft and a bypass clutch for engaging said input shaft with said output shaft, the method comprising:

judging that said vehicle travels on a grade;

detecting a shift gear train of said automatic transmission;

detecting an operation of a parking brake;

partially engaging said bypass clutch when it is judged that said vehicle is in standstill and said shift gear train is a start gear train and said parking brake is operative; and engaging said bypass clutch when it is judged that said vehicle is in a standstill and said shift gear train is a start gear train and said parking brake is inoperative.

* * * * *